(12) United States Patent
Kepner

(10) Patent No.: US 8,631,031 B1
(45) Date of Patent: Jan. 14, 2014

(54) MULTIDIMENSIONAL ASSOCIATIVE ARRAY DATABASE

(75) Inventor: Jeremy V. Kepner, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 392 days.

(21) Appl. No.: 13/009,100

(22) Filed: Jan. 19, 2011

(51) Int. Cl.
*G06F 17/30* (2006.01)

(52) U.S. Cl.
USPC .......................................... 707/769

(58) Field of Classification Search
None
See application file for complete search history.

(56) References Cited

PUBLICATIONS

Roberto Cornacchia, Querying Sparse Matrices for Information Retrieval, Centrum voor Wiskunde en Informatica, Amsterdam, The Netherlands, May 19, 2006.*

\* cited by examiner

*Primary Examiner* — Anteneh Girma
(74) *Attorney, Agent, or Firm* — Anderson Gorecki & Rouille LLP

(57) ABSTRACT

An associative array stores data in a matrix form responsive to linear algebra operations. A set of associative arrays employed for representing data are each composable, such that operations performed on them generate a result that is also an associative array responsive to linear algebra operations. An algebraic engine implements standard linear algebra computations for performing database operations. In contrast to conventional relational models, the associative arrays are not bound by a rigid schema and transaction atomicity, which tend to impose transactional overhead. The associative arrays store only non-null entries as tuples. The tuples, are responsive to linear algebra operations, which employ simpler coding constructs than conventional relational SQL or other access mechanisms. The associative arrays and algebraic engine enjoy relaxed consistency, which recognizes that many queries seek information that is malleable over time, and need not rely on global consistency or transaction atomicity in order to retrieve useful results.

22 Claims, 12 Drawing Sheets

MULTIDIMENSIONAL ASSOCIATIVE ARRAY DATABASE

GOVERNMENT RIGHTS

This invention was developed with Government support awarded by the United States Air Force under Government Contract Number FA8721-05-C-0002. The government has certain rights in the invention.

BACKGROUND

Relational database models have gained popularity in recent decades over more traditional network and hierarchical models. Continuous advances in computational resources and memory leverage the transactional atomicity of large databases for ensuring database consistency across many geographically distributed users. The banking and finance industries have relied on relational databases for financial transactions, in which global consistency ensures that the same DB object (account, for example) is not simultaneously accessed by separate users, for example. This conventional approach relies on 1) adequate database size and 2) a database application operable for performing the required accesses. Both factors increase cost, which has largely been acceptable as storage and computation efficiency increase. However, larger institutions which operate such traditional models find acceptability in maintaining massive volumes of storage for supporting an equally vast user base.

Traditional, rigid, relational models do not lend themselves well to modern database trends where substantial computational power is available to even modest users, due largely to the Internet. Many users seek information, rather than rigid, absolute, results, such as financial or scientific computations. In such a context, it may be less compelling whether your search engine returns the top 499 or 500 documents pertinent to a topical query, in contrast to the traditional model employed in an accounting context for computing payroll or accounts receivable, for example. However, the traditional model, characterized by relational databases executing SQL (Structured Query Language) operations persists because it has been effective, if not inexpensive and efficient, and is embedded in many of the contexts where it is employed.

SUMMARY

An associative array stores data in a multi-dimensional array form responsive to linear algebra operations. A set of associative arrays employed for representing data are each composable, such that linear algebra operations performed on them generate a result that is also an associative array responsive to linear algebra operations. An algebraic engine implements standard linear algebra computations for performing database operations such as queries. In contrast to conventional relational models, the associative arrays are not bound by a rigid schema and transaction atomicity, which tend to impose transactional overhead. The associative arrays represent database (DB) tables as a sparse multi-dimensional arrays by storing only non-null entries as a linear array of row, column, value tuples. The tuples, or triple stores, occupy memory only for non-null entries, and are responsive to a standard suite of linear algebra operations, which typically require simpler coding constructs than conventional relational SQL or other access mechanisms. The associative arrays and algebraic engine are neutral to relaxed consistency, which recognizes that many queries seek information that is malleable over time, and need not rely on global consistency or transaction atomicity in order to retrieve useful results.

Conventional databases typically follow a relational model, which employs a set of tables, each having a fixed number of fields (columns), some of which are key fields for indexing into other tables in the database. A database management system (DBMS) identifies the key fields and types of relationship for indexing to the other tables, such as 1:1, 1:N or N:M relations. Complex queries are enabled by traversing the relations between different tables, typically with an operation such as a "join", which links multiple tables through the key fields, and is often computationally and memory intensive. Further, transaction atomicity (ensuring that one access is complete before the next begins) invokes a series of locks on each of the joined tables, further restricting database access.

Unfortunately, conventional databases suffer from the shortcomings of database management systems (DBMSs) that employ rigid consistency and fixed schemas that require complete structural definition of table fields up front, before storing any data, and comprehensive locking mechanisms that ensure global consistency so that each access enjoys a serialized snapshot view of the database. Configurations herein are based, in part, on the observation that many database operations do not require rigid consistency and global atomicity of transactions in order to provide useful results.

Accordingly, configurations herein substantially overcome the above-described shortcomings by providing a database via a set of associative arrays, or matrices, rather than relational tables. The associative arrays are defined as a composable sparse multi-dimensional array that is responsive to linear algebra operations performed by an algebraic engine. Composable refers to the property that the result of an operation is also a composable matrix or array, and hence an output array may immediately serve as input to a successive operation or function, therefore allowing mathematical expressions that refer to multiple computations. The associative array differs from conventional database tables because 1) fetch operations generally pertain to row key or column keys; 2) there are an infinite number of rows or columns, as they are not dimensionally bounded as relational tables, and 3) relaxed consistency relieves locking and atomicity processing. An associative array as discussed herein may be a two dimensional array, sometimes referred to as a matrix, or may have different dimensions; it should be noted that some of the operations discussed further below expect a matrix operand.

In contrast to conventional approaches, the disclosed associative array stores both string and numeric data in an array form responsive to linear algebra operations. While many of the examples in the following discussion employ two dimensions (or "matrix" form) for simplicity of example, various dimensional degrees may be employed i.e. a multi-dimensional array (1D, 2D, 3D, . . . ) instead of a matrix, given sufficient memory and processing capabilities.

Composable mathematical operations as defined herein employ composable arrays as input, and generate a composable array as output, thus the result of one operation may be employed as input to a successive operation. An associative array only consumes storage for non-null values, hence it lends itself well to representing sparse arrays. Conventional relational table structures allocate storage space for each possible element regardless of whether it is populated. In configurations disclosed herein, an associative array server (DB server) stores the associative arrays in a data structure as a composable associative array, meaning that the associative arrays are responsive to matrix operations on a normalized data structure, and therefore generate a result matrix that it itself a composable array and operative for further matrix operations.

The matrix operations are defined by linear algebra functions, and are implemented by an algebraic engine. In the example configuration, the algebraic engine is a library of matrix functions, such as provided by the Matlab application, available commercially from The MathWorks®, Inc. of Natick, Mass. Other suitable linear algebra applications may also be employed.

In further detail, the method of populating and querying a database as disclosed herein includes generating a sparse array having a set of values for a first axis, a set of values for a second axis, and a set of tuples, each tuple corresponding to an array value associated with a first axis value and a second axis value. A storage manager identifies a set of first values corresponding to a range of attributes for the first axis, identifies a set of second values corresponding to a range of attributes for the second axis, and stores, for each relation between a first axis value and a second axis value, the array value in a tuple. An associative array server identifies an array operation, in which the generated sparse array is responsive to the identified array operation, and invokes an algebraic engine for performing the identified array operation. In an example arrangement, the storage manager stores the set of data in a sparse matrix having the first value set as a first axis, the second value set as a second axis, and the corresponding association as a tuple, such that the sparse matrix is responsive to at least one other sparse matrix for performing composable mathematical operations, in which the composable mathematical operations generate another composable sparse matrix.

In particular configurations disclosed further below provide (1) A composable associative array that stores both string and numeric data in a multi-dimensional array form (1D, 2D, 3D, . . . ) responsive to linear algebra operations;

(2) A composable associative array that provides a portable *single* abstraction for representing both serial and parallel data independent of how it is stored (memory, files, SQL databases, NoSQL databases);

(3) A composable associative array that provides a portable *single* abstraction for all database operations (create, insert, query, delete); and (4) A composable associative array that provides a portable *single* abstraction for databases that can create arbitrary rows and columns (i.e., NoSQL databases or triple stores).

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
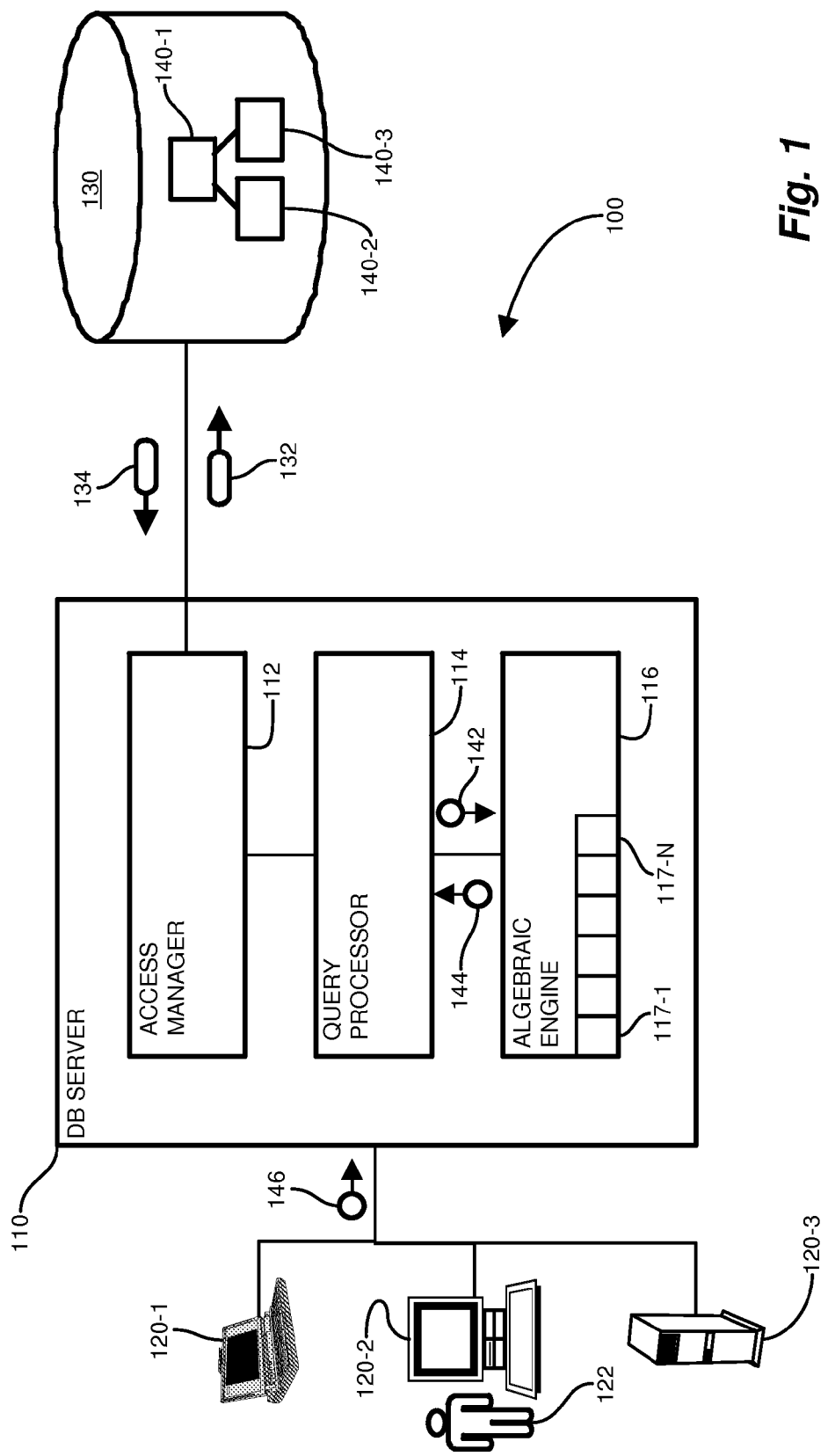
FIG. 1 is a context diagram of a database environment suitable for use with configurations disclosed herein.

Depicted below is an example configuration of a database environment 100 employing associative arrays as sparse matrices for storing data and responding to interactive queries from a user. Sparse matrices provide efficient storage since storage need only be allocated for non-null tuples, or relations in the database defined by a combination of axis values (typically 2 in a two dimensional array, or matrix). Matrix operations on these sparse matrices allows substantially more efficient coding (on the order of 1:10-1:50) fewer lines of code than conventional relational database operations for corresponding queries, such as via Java based SQL. Invocation of an algebraic engine, via DLLs, toolkit calls, or other suitable passing mechanism or remote procedure call (RPC), allows deferral of computationally intensive matrix operations, further simplifying the coding effort. An algebraic engine responsive to overloaded functions, or methods, allows implementation of matrix operations using the data structure for composable associative arrays to recognize the type of data (such as numeric or string) in an associative array and invoke corresponding linear algebra operations.

The disclosed associative arrays are particularly powerful for constructing algorithms that operate on string data, due to the strength of the linear algebra computation combined with ability of associative arrays to store the string data. For example, in contrast to conventional SQL statements, as is known in the art, the use of associative arrays an algorithm can typically be expressed using 10× less lines of code than using Java or C++ for implanting similar SQL calls or other standard approaches. In other words, for consideration of developmental (i.e. coding) resources, a programmer can write a comparable program in 10× less time. Further, the resulting operation can be expected to complete in about half the time. Greater performance gains may be obtained in alternate configurations discussed below.

The relaxed structure and consistency of the associative arrays are particularly well suited to document queries as is commonly performed across broad data repositories via a public access network such as the Internet. Similarly, emerging database technologies such as NoSQL databases, which generally strive to avoid the rigor of conventional SQL having a fixed, unmodifiable schema (i.e. immutable column sizes and dimensions), are particularly well suited to this approach.

A non-schema database such as a NoSQL database, particularly well suited to Internet based processing, relieves the rigid row and column normalization required with conventional SQL. Since this rigid structure must be employed with similar specificity in SQL coding operations, a NoSQL implementation of the disclosed associative arrays compounds the benefit. In such a NoSQL implementation, the sparse array has a dynamic column structure not bound by a rigid schema, such that at least one of the axes represented by a list of array values expandable with the addition of tuples, i.e. additional tuples may be added, with the property that they simply extend the axis for the values they add.

FIG. 1 is a context diagram of a database environment suitable for use with configurations disclosed herein. Referring to FIG. 1, the database environment 100 includes a database (DB) server 110 having an access manager 112, a query processor 114 and an algebraic engine 116. The DB server 110 connects to user or client devices such as laptops 120-1, desktop PCs 120-2 and remote clients 120-3 (120 generally). The user devices 120 interact with users 122 for receiving input and rendering responses, and may include any suitable rendering device such as wireless phones, 4G devices, PDAs and the like.

A storage domain 130 stores the associative arrays 140-1, 140-2, 140-3 (140 generally) such that each may relate or correlate to other associative arrays 140. The associative arrays 140 store only tuples (axes and corresponding values) rather than conventional arrays which store a value for each permutation of axis values. Generally, the associative array 140 is a two dimensional structure having relations to other arrays 140-N, although greater dimensional structures may be included. The access manager 112 stores 132 and retrieves 134 the arrays 140, and may be coupled to local harddrive or other suitable storage medium serving as the repository 130. The query processor 114 receives queries 146 from a user and invokes the access manager 112 for retrieving the associative arrays 134 (arrays) implicated in the query 146. The query processor 114 also invokes the algebraic engine 116 using one or more of the retrieved arrays 134 as operands 142-1 . . . 142-N (142 generally), for performing operations and receiving a results array 144. The algebraic engine 116 includes a plurality of operations and/or functions 117-1 . . . 117-N for applying to the retrieved associative arrays 134. The results array 144 is a composable associative array (as are the operands 142), meaning that it may in turn be employed as an operand 142 in a successive invocation of the algebraic engine 116.

The use of composable associative arrays 140 allows successive functions and/or operations to be applied in series, as discussed further below. The algebraic engine 116 may be any suitable suite of invokable operations, such as via a toolkit, DLL or other library, or other suitable form of calling or invocation. In the example arrangement, the algebraic engine is particularly suited to two dimensional arrays, or matrices (matrix), for performing matrix operations according to linear algebra and/or array arithmetic techniques, however may be any dimensional order corresponding to the operations 117.

Associations between multidimensional entities (tuples) using number/string keys and number/string values can be stored in associative array data structures. For example, in two dimensions an associative array entry might be:

A('alice', 'bob')='talked'
A)'alice','bob')=47.0

The above tuples have an 1-to-1 correspondence with triple store representation:

('alice', 'bob', 'talked')
('alice', 'bob', 47.0)

Constructing complex composable query operations as disclosed herein can be expressed using simple array indexing of the associative array keys and values, which themselves return associate arrays. Examples of composable array operations include:

| | |
|---|---|
| A('alice', : ) | Get the alice row |
| A('alice bob', : ) | Get the alice and bob rows |
| A('al*', : ) | Get rows beginning with al |
| A('alice : bob') | Get the range of rows from alice to bob |
| A(1:2, : ) | Get the first two rows |
| A == 47.0 | Get the sub-array with values equal to 47.0 |

The composability of associative arrays stems from the ability to define fundamental mathematical operations whose results are also associative arrays. Given two associative arrays A and B, the results of all the following operations will also be an associative array:

| | | | | |
|---|---|---|---|---|
| A + B | A − B | A & B | A \| B | A * B |

Associative array composability can be further grounded in the mathematical closure of semirings (i.e., linear algebraic "like" operations) on multi-dimensional functions of infinite strict totally ordered sets (i.e., sorted strings).

Example syntax for specifying and rendering an associative array via the DB server 110 is as follows. Note the different rendering commands "display" and "disp", in which the former displays rows as tuples and the latter dumps string values of parallel linear arrays:

For a 3*3 array of pairs of letters A0:
   <<A0=Assoc('aa bb c ',' dd ee ff', 'gg hh ii ')
   >>display(A0)

| | |
|---|---|
| (aa, dd) | gg |
| (bb, ee) | hh |
| (cc, ff) | ii |

<<disp(A0)
   Associative Array
     row: 'aa bb cc '
     col: 'dd ee ff '
     val: 'gg hh ii '
       A: [3×3 double]

For a first numeric column A1:
<<A1=Assoc([1 2 3].',' dd ee ff ',' gg hh ii ')
>>display(A1)

|        |    |
|--------|----|
| (1, dd)| gg |
| (2, ee)| hh |
| (3, ff)| ii |

<<disp(A1)
Associative Array
   row: ' ' /* appears null due to numeric values */
   col: 'dd ee ff '
   val: 'gg hh ii '
   A: [3×3 double]
For a second numeric column A2:
>>A2=Assoc('aa bb cc ',[1 2 3].',' gg hh ii ')
>>display(A2)

|        |    |
|--------|----|
| (aa, 1)| gg |
| (bb, 2)| hh |
| (cc, 3)| ii |

>>disp(A2)
Associative Array
   row: 'aa bb cc '
   col: ' '
   val: 'gg hh ii '
   A: [3×3 double]
For a ordered pairs of ASCII values denoting numerics A3:
>>A3=Assoc('aa bb cc ',' dd ee ff ',[1 2 3].')
>>display(A3)

|         |   |
|---------|---|
| (aa, dd)| 1 |
| (bb, ee)| 2 |
| (cc, ff)| 3 |

>>disp(A3)
   Associative Array
     row: 'aa bb cc '
     col: 'dd ee ff '
     val: ' '
     A: [3×3 double]

Figure 2:
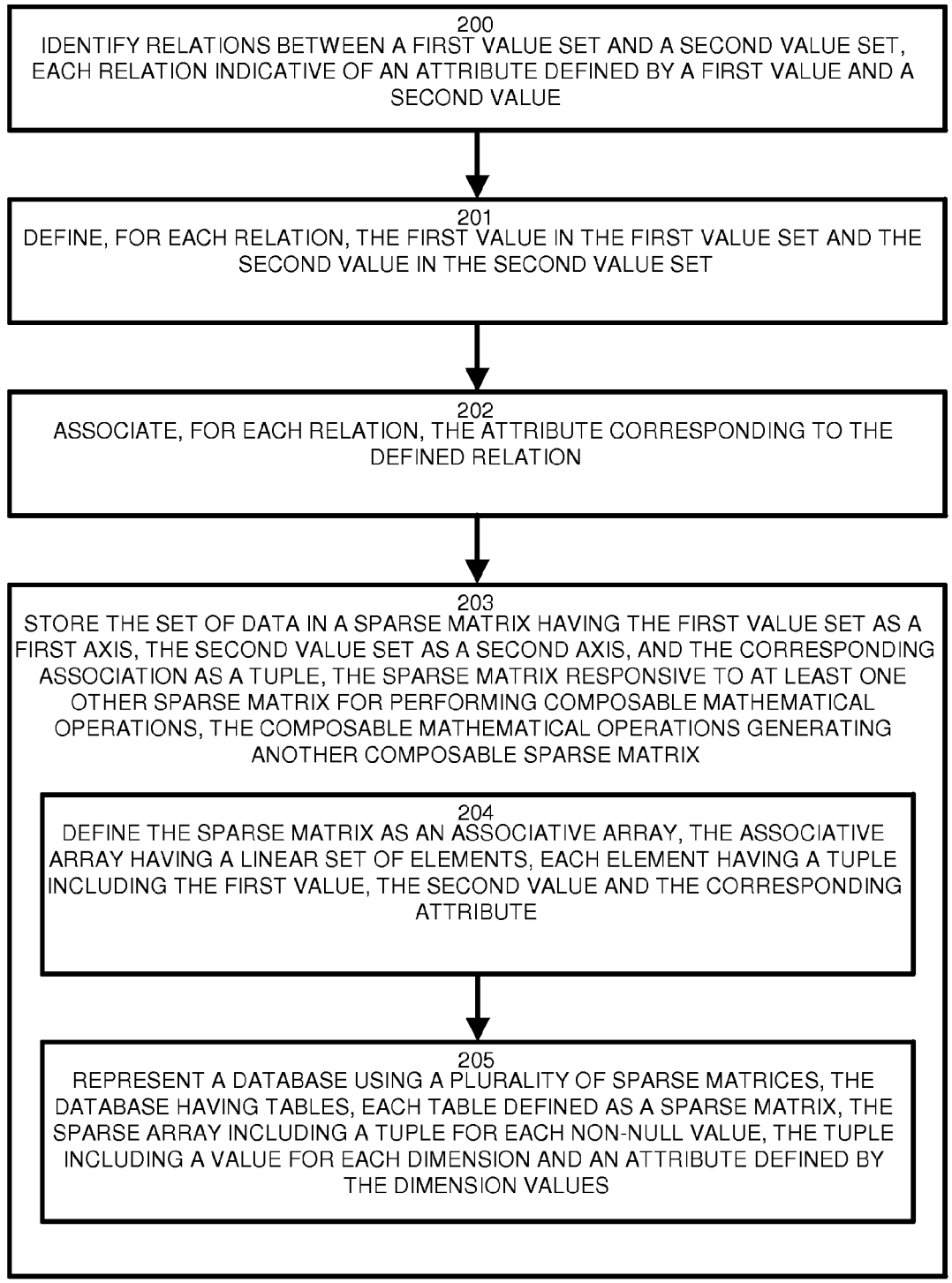
FIG. 2 shows relations stored in an associative array in the database of FIG. 2.

FIG. 2 shows relations stored in an associative array 150 in the database of FIG. 1. Referring to FIG. 2, associative arrays store attributes, or relations, linking one or more sets of values, or facets, to the respective attribute. Unlike conventional array storage using row major or column major ordering, associative arrays store only non-null attributes 152 defined by an association, or relation 156, among value sets 154-1, 154-2 (154 generally) of values. The associative array representation recognizes each set of values 154 as an axis 158-1, 158-2 and the attribute as an intersection 160 of the axes, however relations may also be represented in alternate forms, such as a directed graph 162 or undirected graph. In the associative array 150 as disclosed herein, each association of values 154 to attributes 152 stores the values 154-N and associated attributes 152 as a tuple 155 in a set of tuples defining the entire array 150. Such a mechanism is particularly well suited to sparse arrays because the array 150 allocates tuple storage only for non-null attributes, as discussed further below. Two axes 158 are shown in the example, however other dimensional quantities may be employed. In the example arrangement discussed further below, two dimensional associative arrays 150 lend themselves well to matrix operations using linear algebra.

Representation of the associative arrays 150 recognizes that a sparse matrix (i.e. many null values) is more efficient to represent by storing only non-null values, in contrast to conventional mechanisms which designate storage for every possible value. Accordingly, configurations herein adopt a data structure which stores tuples 155 of only each non-null value. As indicated above, a tuple 155 is a reference to an array having an index for reach dimension and the corresponding attribute. In a two dimensional array, or matrix, a tuple 155 therefore has 3 values denoting each of two axes and the corresponding attribute, also called a triple store.

Web pages, documents, audio, images, and video all produce very different kinds of data. Traditional database require different tables to handle such a range of data. Tuple stores handle all of this data by treating them all as key/value pairs. This greatly simplifies the design of the database and allows for significant performance improvements.

For example, consider a traditional database table where each row represents the keywords in the document. Column names of this table might be "keyword1," "keyword2," ... To find a row with a particular keyword entry requires a complete scan of the table or the construction of an index of all the entries. In a row/col/val triple store each row represents a document and the column keys can be the actual keywords themselves.

Associate arrays provide a 1-to-1 mapping onto the tables in a tuple 155 store which makes complex manipulations efficient to code. Storing both the table and its logical transpose in the database 130 allows for all rows and columns to be searched efficiently without the need to build specialized indexes. Associative arrays 150 can make both the insertion and retrieval of data from transpose pairs transparent to the user 122.

Measurements using the disclosed database server 110 with associative arrays 150 indicate that adding new datasets can be implemented with substantially less coding effort than standard approaches that employ SQL calls, for example. For particular applications, as depicted below, conventional approaches using embedded SQL require ten times the number of lines of code as compared to matrix operations employing associative arrays performing similar operations.

The DB server 110 provides a database and computation system that combines composable associative arrays, distributed arrays, and tuple stores in an integrated manner. Conventional DB syntax and access methods, which include Perl®, SQL, Hbase, MPI®, HPF, UPC VSIPL++ and pMatlab™, do not provide associative array support for at least two dimensions, nor composable queries and composable computations allowing results of an operation as input to a successive operation. None of the conventional distributed array technologies implement an associate array as disclosed herein. In contrast, configurations herein implement multi-dimensional numeric associative arrays and composable associative arrays, and further, provide associative array technology that can take advantage of the features of a tuple store.

Figure 3:
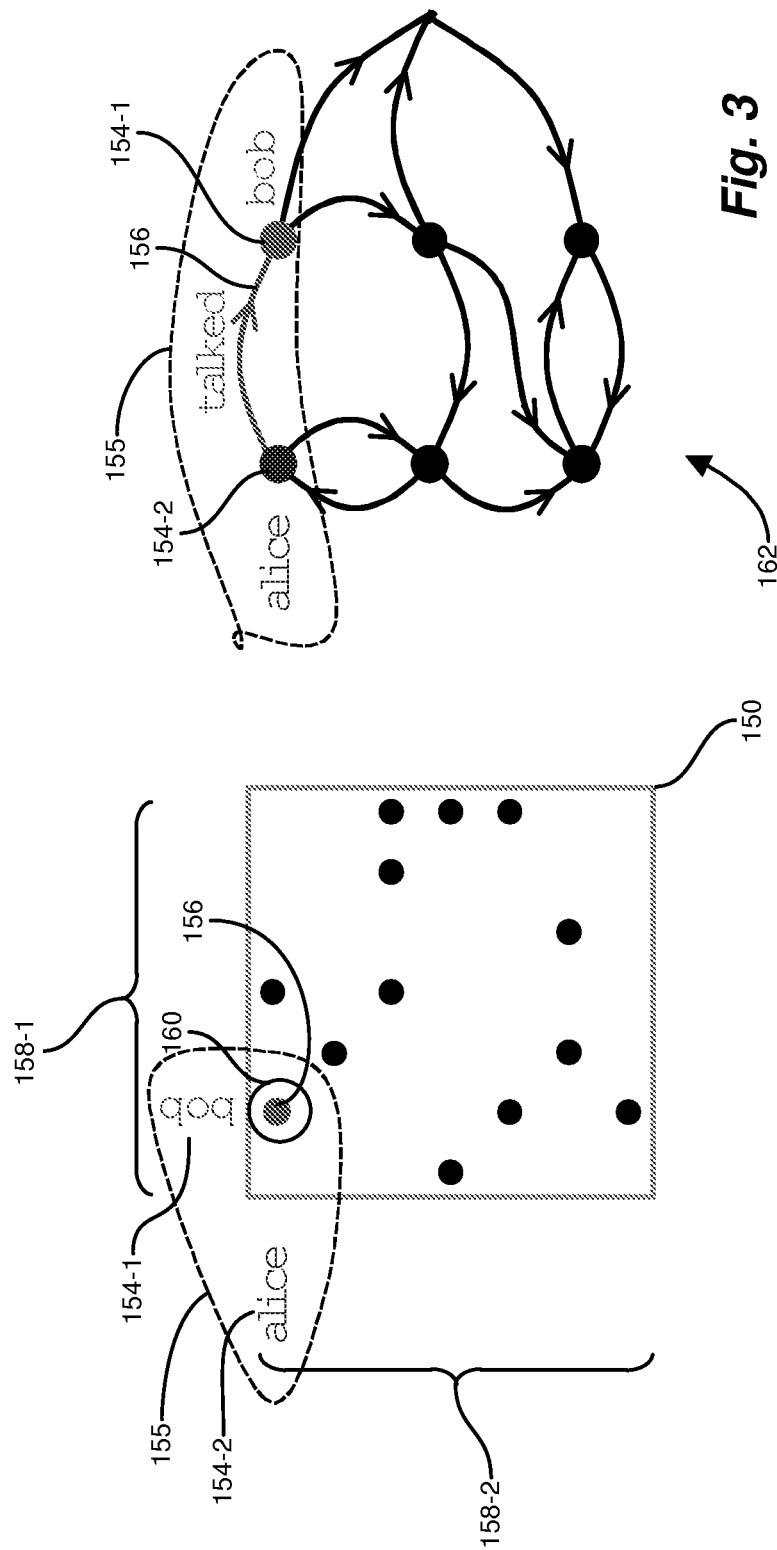
FIG. 3 is a flowchart of database storage in the environment of FIG. 1.

FIG. 3 is a flowchart of database storage in the environment of FIG. 1. Referring to FIGS. 1 and 3, the method of representing a set of data as a sparse matrix in an associative array 150 as defined herein includes, at step 200, identifying relations between a first value set and a second value set, such that each relation 156 is indicative of an attribute 160 defined by a first value 154-1 and a second value 154-2. The sparse matrix 150 defines, for each relation 156, the first value 154-1 in the first value set 158-1 and the second value 154-2 in the second value set 158-2, as shown at step 201. The sparse matrix 150 associates, for each relation 156, the attribute 160 corresponding to the defined relation 156, as depicted at step 202. In contrast to conventional arrays, which allocate an attribute 160 for each intersection of each value 154 of each axis 158, associative arrays store only the tuple 155 forming the association 156, hence "Alice", "Bob" and "talked". The access manager 112 stores the set of data in a sparse matrix 150 having the first value set 154-1 as a first axis 158-1, the second value set 154-2 as a second axis 158-2, and the corresponding association 156 as a tuple, such that the sparse matrix 150 is responsive to at least one other sparse matrix for performing composable mathematical operations, in which the composable mathematical operations generating another composable sparse matrix, as disclosed at step 203. Each value set 154 is a set of one or more values, in which each value is represented by an increment on the corresponding axis 158. This includes defining the sparse matrix as an associative array 150, in which the associative array 150 has a linear set of elements, each element having a tuple including the first value 154-1, the second value 154-2 and the corresponding attribute 156, as depicted at step 204. A plurality of associative arrays 140 may be employed for different value sets 154, each having a corresponding axis 158 in an associative array 150. Accordingly, the storage domain 130 represents a database using a plurality of sparse matrices 150-N, the database having tables, each table defined as a sparse matrix 150-N, such that the sparse matrix includes a tuple 155 for each non-null value, in which the tuple 155 includes a value 154 for each dimension 158 and an attribute 156 defined by the dimension values 154-N, as disclosed at step 205. An arbitrary collection of associative arrays 150 may be stored as a sparse matrix for associating various data sets 154, each represented by an axis 158. The use of a sparse matrix relieves the storage demand imposed by conventional relational models having large dimensions.

The programming benefit of associative arrays is independent of where the data is stored, The data can be stored in files, an SQL database or a NoSQL database (i.e., a triple store). However, it so happens that string data is typically is stored in databases. The associative array is agnostic at to whether or not the database is SQL or NoSQL. Thus, the associative array is a unifying interface that can exploit all these kinds of databases. In contrast to conventional approaches, the disclosed associative array is the can span both SQL and NoSQL databases.

Such NoSQL databases have unique power to handle an arbitrarily large number of columns and to create new columns dynamically, Associative arrays lend themselves well to such a non-schema approach. Thus, the disclosed Associative arrays provide a mechanism to exploit the increased power offered by NoSQL databases, which is often at least 10× greater than SQL databases for certain types of operations. For example, in particular coding operations:

1. String algorithms using data in files.

Associative arrays achieve a benefit of 10× reduction in lines of code, 2× improvement in performance.

2. String algorithms use data in an SQL database.

Associative arrays achieve a benefit of 20× reduced lines of code, 2× improvement in performance.

3. String algorithms use data in a NoSQL database

Figure 4:
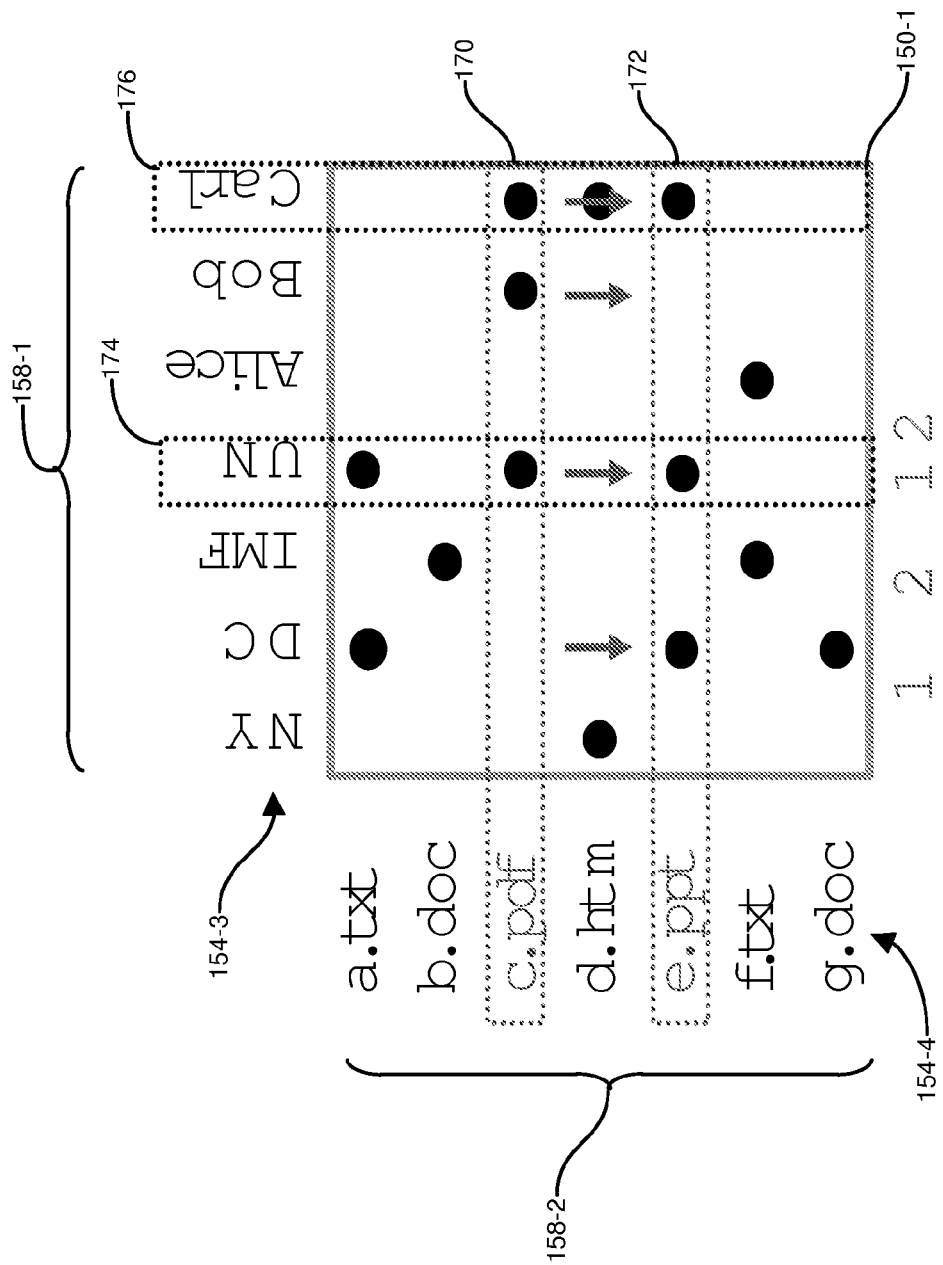
FIG. 4 shows document storage and indexing in an associative array as in FIG. 3.

Associative arrays achieve a benefit of 50× reduced lines of code, 10× improvement in performance. Thus, the identified array operations performs similar processing and generating a similar result as a sequence of SQL code, in which the SQL code would have consumed at least ten times the number of code instructions FIG. 4 shows document storage and indexing in an associative array as in FIG. 3. Referring to FIG. 4, an associative array 150-1 stores keywords and documents as value sets 154-3 and 154-4, respectively (note that the set of keywords may be every word in the document to enable a robust search due to the storage efficiency of the sparse array form of the associative array 150). The keywords 154-3 occupy an axis 158-1 and the documents 154-4 are represented along axis 158-2. The associative array 150-1 relates the documents 154-4 to the entities (keywords) 154-3, given by the expression $A(x,y): S^{N \times M} => R$. Performing a query 146 to identify all documents 158-2 including keywords "UN" and "Carl" is defined as:

$Y_1$="UN"
$Y_2$="Carl"
$A(:,Y_1)* A(:,Y_2)$

Entity counts of the above set of documents is obtained via a matrix multiple operation: $(A(:,Y_1)* A(:,Y_2))^T$ Documents having either "UN" or "Carl" are shown by dotted line boxes 174 and 176. Documents having both are shown by facet boxes 170 and 172.

Figure 5:
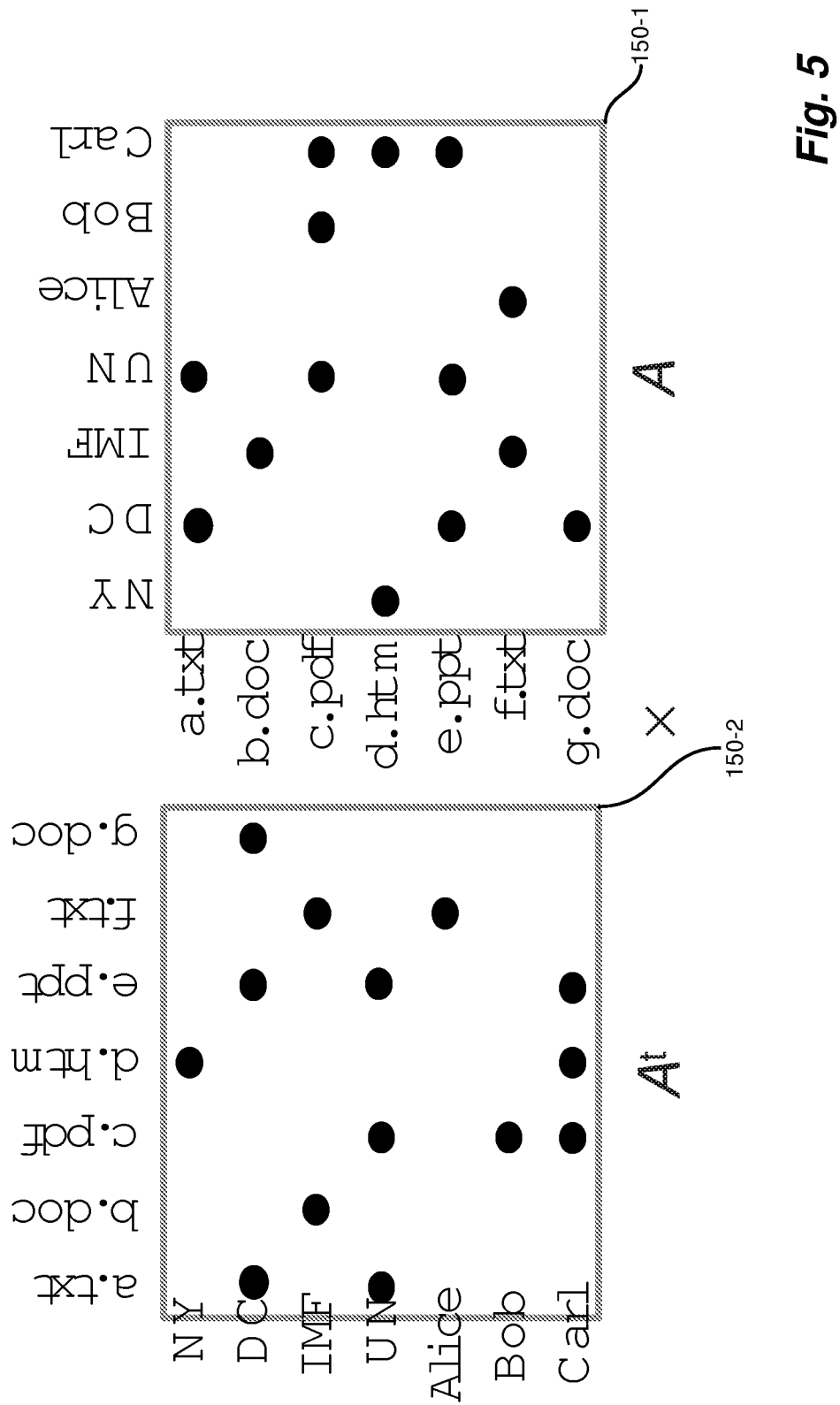
FIGS. 5 and 6 show a correlation of document facets using documents indexed as in FIG. 4.
Figure 6:
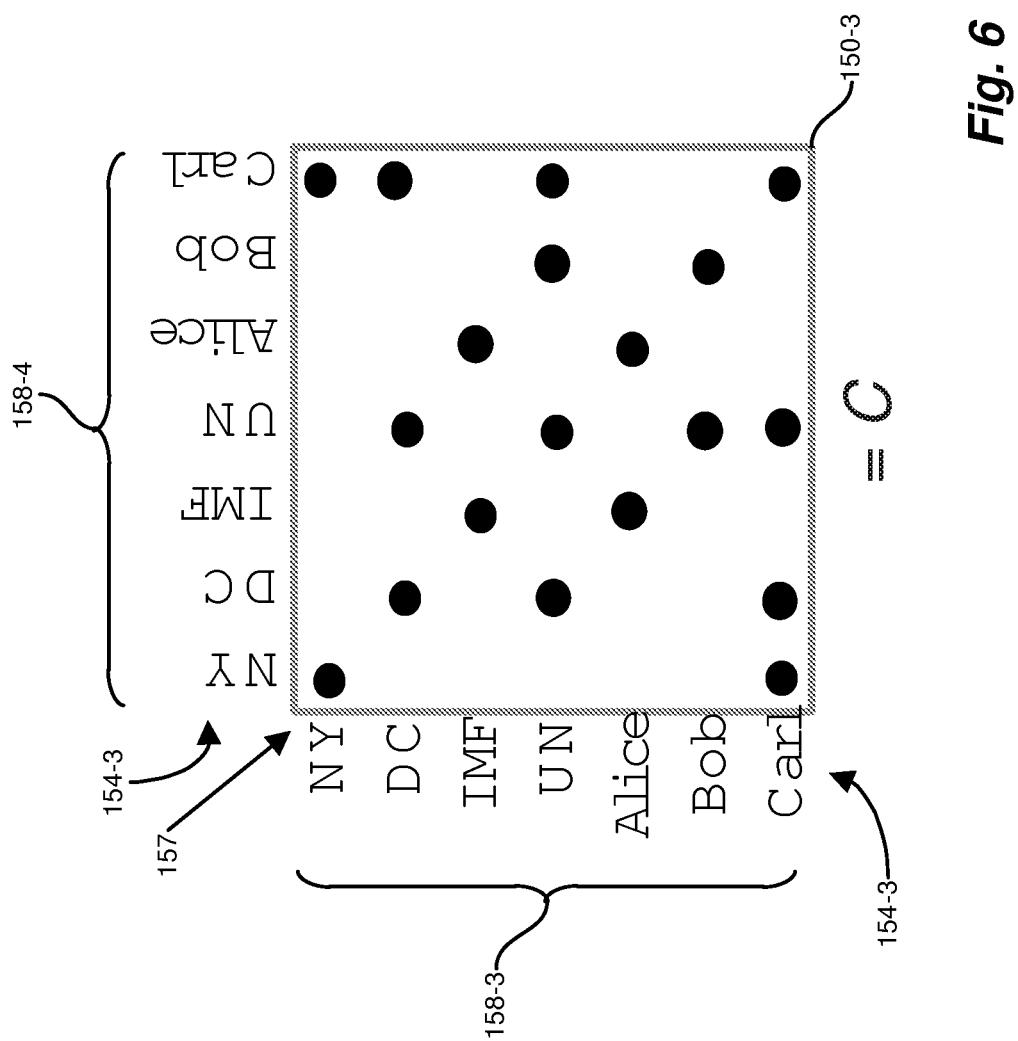
Figure 7:
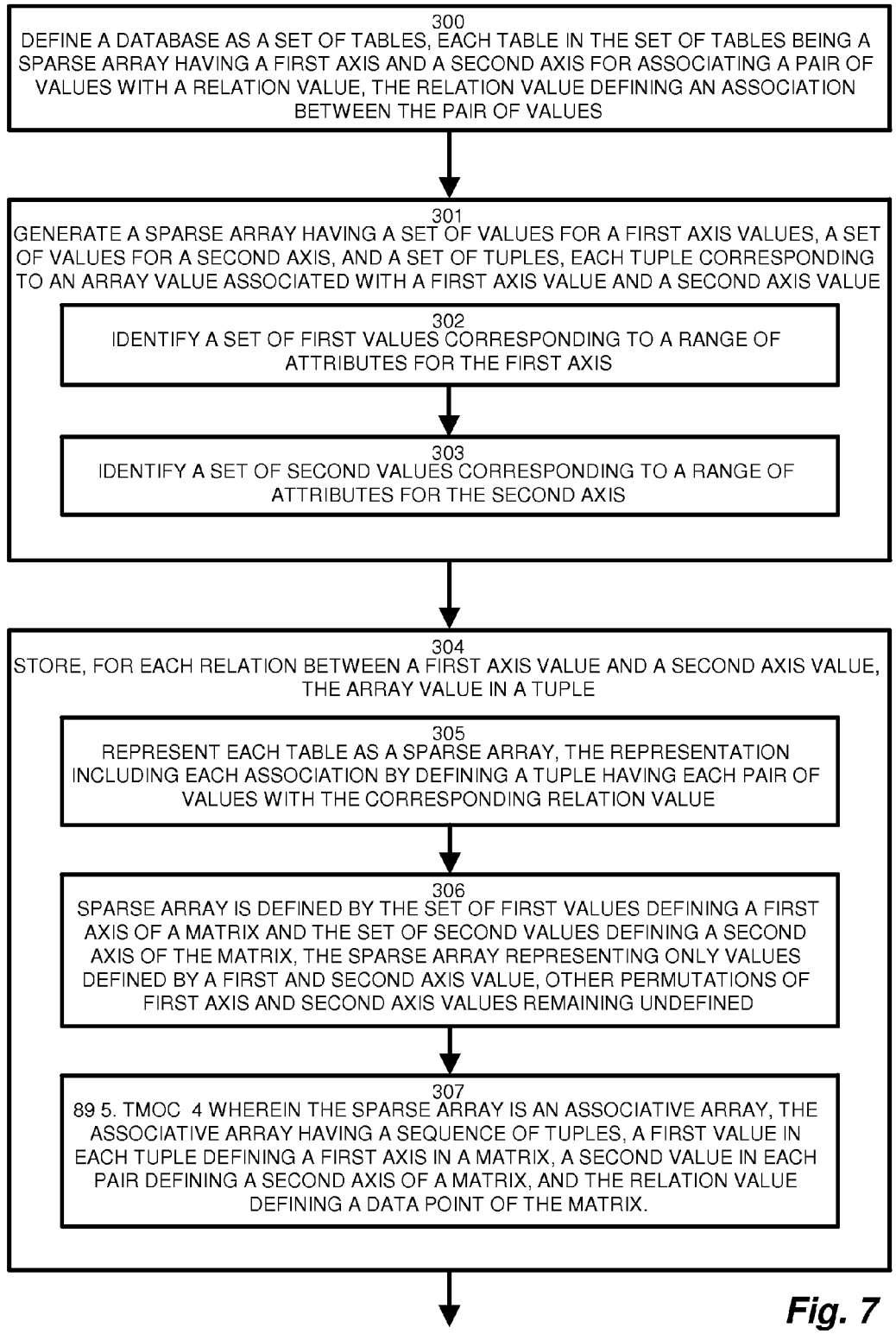
FIG. 7-10 show a flowchart of document query processing of documents stored as in FIGS. 3-5.
Figure 8:
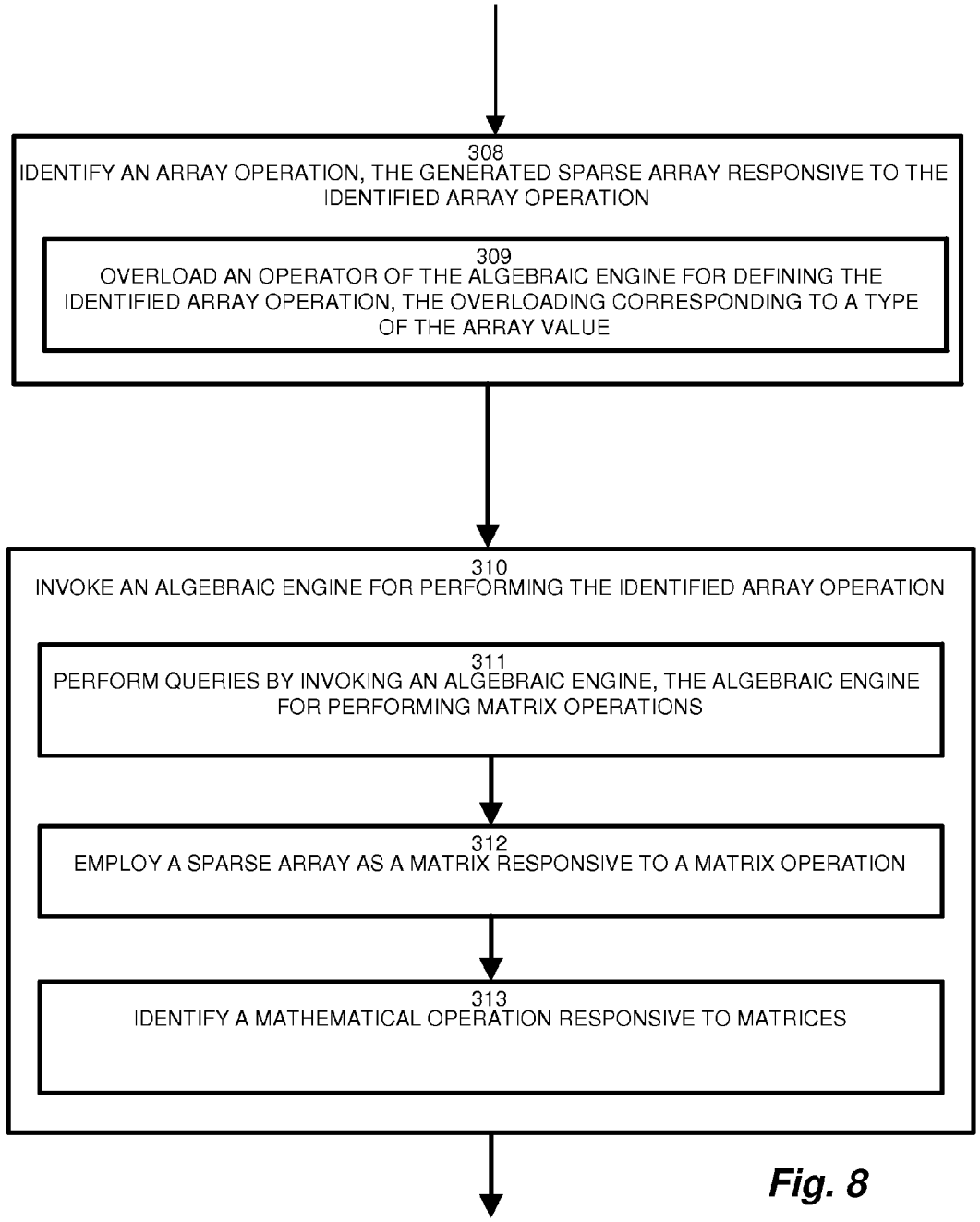
Figure 9:
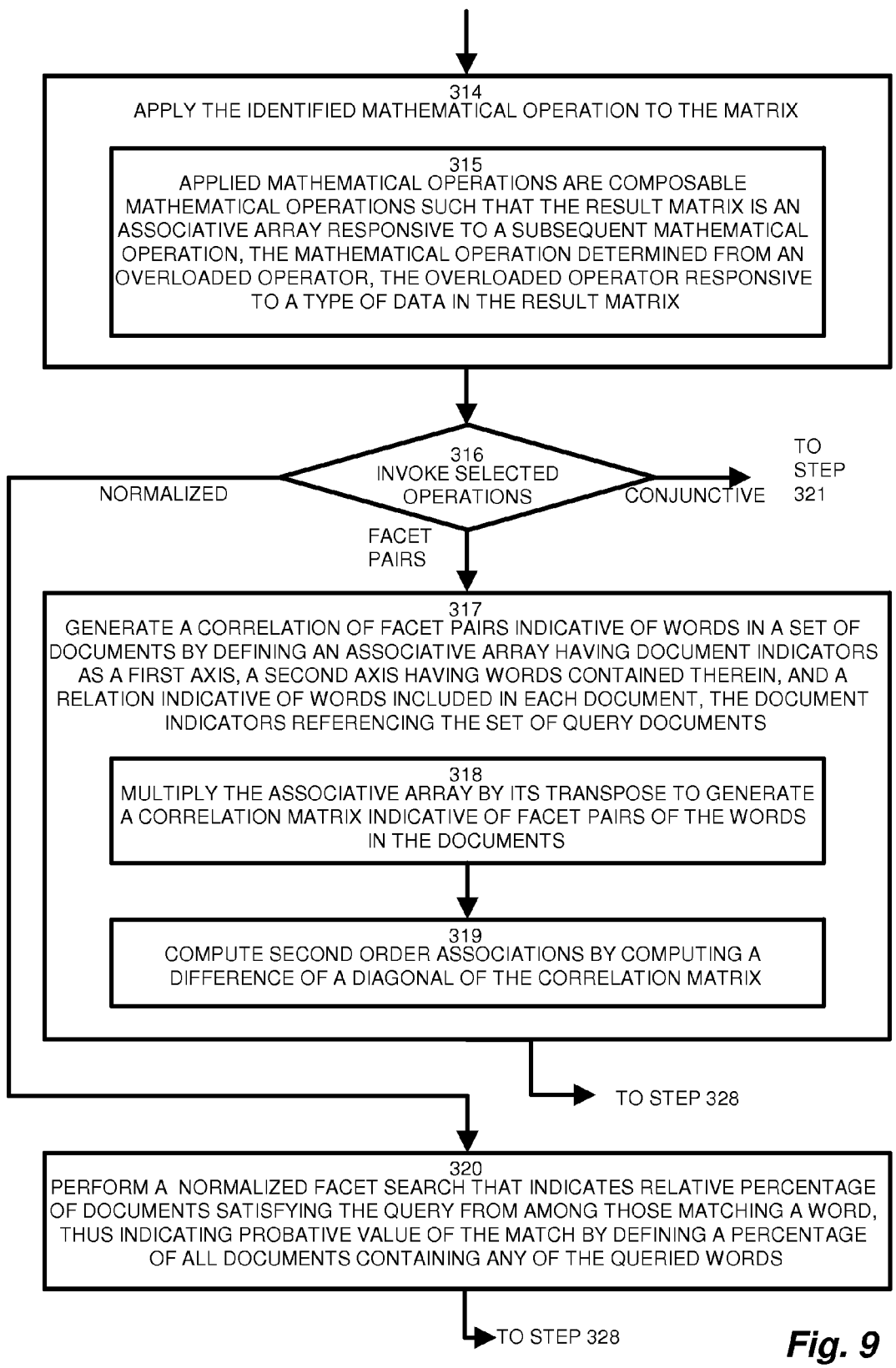
Figure 10:
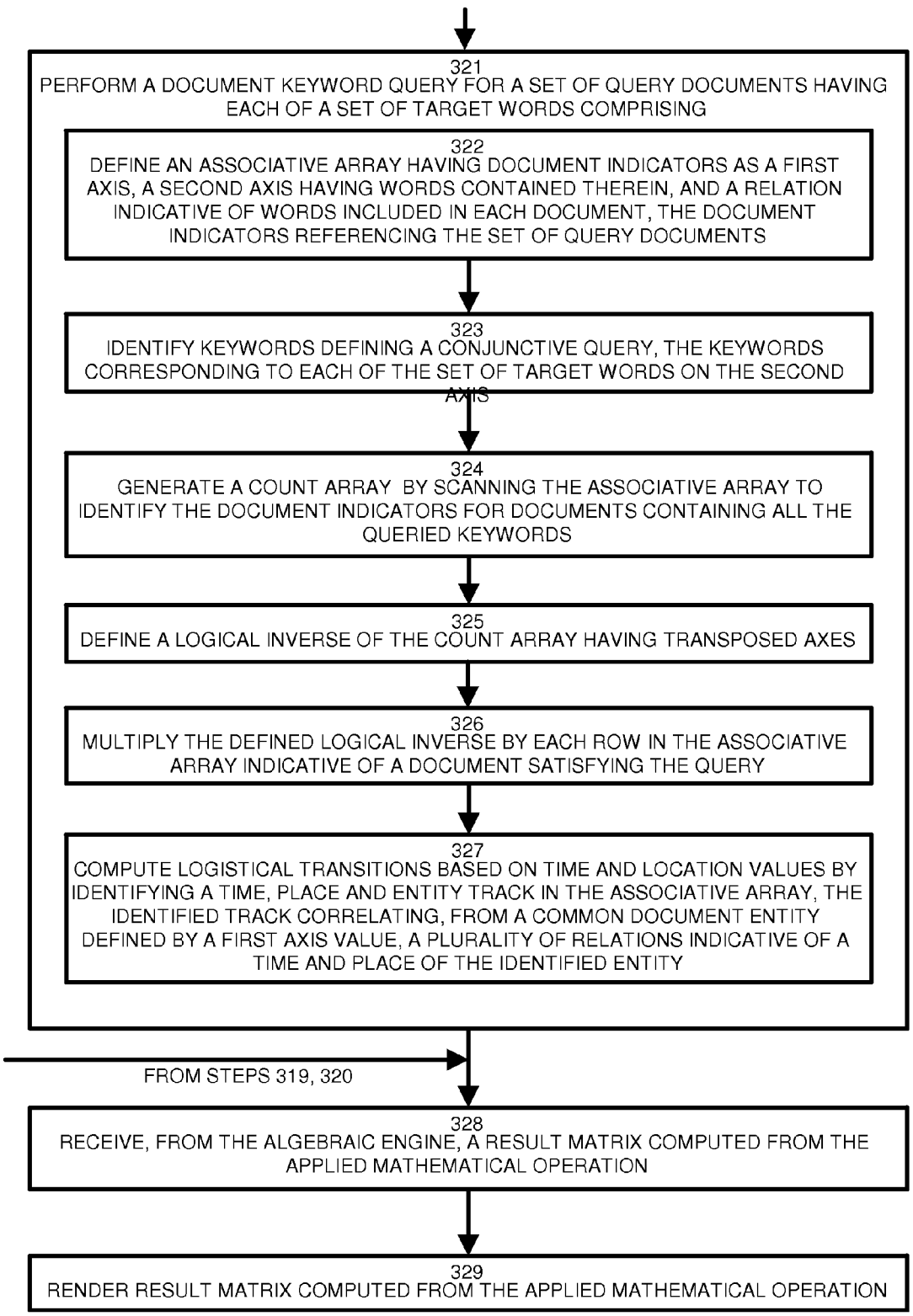

FIGS. 5 and 6 show a correlation of document facets (attributes) using documents indexed as in FIG. 4. A matrix multiplication of the keyword associative array 150-1 by its transpose 150-2 yields a diagonal matrix (reflective across the diagonal) 150-3 as shown in FIG. 6. This result matrix 150-3 shows, for each facet (values defined by the axis) along an axis 158-3, 158-4, which other locations appear together in a common document. Since it is a diagonal matrix, either axis 158-3, 158-4 yields the same set of facets associated with a particular document 154-4. The results indicate, for example, that "UN" is associated with "DC", "Alice" appears in documents having "IMF", Bob is associated with "UN", and "Carl" has associations to "NY", "DC" and "UN"; also the diagonal 157, of course, correlates the trivial fact of matching each facet at least with itself.

Syntax denoting the above operations with the algebraic engine 116, in the example arrangement, is as follows:

To illustrate the use of composable associative arrays consider a facet search on the document keyword table A shown in FIG. 3. First, two keywords are chosen in the table x="UN"; y="Carl"

Next, all documents that contain both of those keywords are found

B=(sum (A :, [x, y]), 2)==2)

Finally, the distribution of keywords in that set of documents is computed

F=transpose (B)*A(row(b), : )

This complex query is therefore performed efficiently in just two lines of code that perform two database queries (one column query and one row query). If the underlying table is a transpose table pair, then both of these queries are be performed efficiently in a manner that is completely transparent to the user. Implementing a similar query in Java and SQL typically takes hundreds of lines of code and requires pre-built indexes to be efficient FIGS. 7-10 show a flowchart of document query processing of documents stored as in FIGS. 3-5 and FIGS. 11-12 below. Referring to FIGS. 1, 3-5 and 11-12, the DB server 110 defines a database 130 as a set of tables 140, such that each table 140 in the set of tables 140-N is a sparse array having a first axis 158-1 and a second axis 158-2 for associating a pair of values 154 with a relation value 160, in which the relation value defines the association 156 between the pair of values 154-1, 154-2, as depicted at step 300. For each of the defined tables 140 in the database 130, the access manager 112 generates a sparse array 150 having a set of values 154 for a first axis 158-1, a set of values 154 for a second axis 158-2, and a set of tuples 155, each tuple corresponding to an array value 160 associated with the first axis value 154-1 and the second axis value 154-2, as shown at step 301. This includes identifying a set of first values 154-1 corresponding to a range of attributes for the first axis 158-1, as depicted at step 302, and identifying a set of second values 154-2 corresponding to a range of attributes for the second axis 158-2, as disclosed at step 303.

The access manager 112 stores, for each relation 156 between a first axis value 154-1 and a second axis value 154-2, the array value in a tuple 155, as depicted at step 304. The tuples 155 are defined as a liner set of facets, or values, for each first axis value, second axis value and associated attribute for each of the non-null attributes, however other representations may be employed. In the example configuration, the DB repository 130 represents each table 140 as a sparse array 150, such that the representation includes each association by defining a tuple 155 having each pair of values 154-1, 154-2 with the corresponding relation (attribute) value 160, as shown at step 305. The sparse array 150 is defined by the set of first values 154-1 defining a first axis 158-1 of the matrix 150 and the set of second values 154-2 defining a second axis 158-2 of the matrix 150, such that the sparse array 150 represents only values defined by the first and second axis value, in which other permutations of first axis and second axis values remaining undefined, as shown at step 306. In the example arrangement, the sparse array 150 is an associative array, in which the associative array has a sequence of tuples 155, such that a first value 154-1 in each tuple 155 defines a first axis 158-1 in the matrix, a second value 154-2 in each pair defines a second axis 158-1 of the matrix 150, and the relation value 156 defines a data point 156 of the matrix 150 having an attribute 160, as depicted at step 307.

The query processor 114 receives a query 146 from a user device 120, and identifies an array operation 117, in which the generated sparse arrays 140 are responsive to the identified array operation 117-1 ... 117-N (117 generally), as disclosed at step 308. In the example configuration, this includes overloading an operator 117 of the algebraic engine 116 for defining the identified array operation 117, such that the overloading corresponds to a type of the array value, as shown at step 309. Overloading accommodates various types of associative arrays 150 for which the algebraic engine 116 may be invoked for, typically one of numeric or string (ASCII) data.

The query processor retrieves the references associative arrays 134 via the access manager 112, and invokes the algebraic engine 116 for performing the identified array operation 117, as shown at step 310. This includes performing queries 146 by invoking the algebraic engine 116, in which the algebraic engine is configured for performing matrix operations, as depicted at step 311, and employing the sparse arrays (retrieved associative arrays 134) as a matrix 150 responsive to a matrix operation 117 performed by the algebraic engine 116, as disclosed at step 312. Based on the requested query 146, the algebraic engine 116 identifies a mathematical operation 117 responsive to matrices, as depicted at step 313.

Based on the query 146 and the associative arrays 134 retrieved as operands 142, the algebraic engine 116 applies the identified mathematical operation 117 to the matrix 150, as depicted at step 314. As indicated above, mathematical operations 117 to be applied are composable mathematical operations in which the result matrix 144 is an associative array 150 responsive to a subsequent mathematical operation 117, such that the mathematical operation is determined from an overloaded operator, thus the overloaded operator is responsive to a type of data in the result matrix 144, as depicted at step 315. The algebraic engine 116 defers control to the selected operation 117, by invoking the selected operation, as shown at step 316. Example operations 117 are depicted in the subsequent steps based on the foregoing examples; alternate configurations may employ similar linear algebra and/or matrix operations depending on the algebraic engine 116.

If the invoked operation is a correlation of facet pairs, also discussed further below, then the algebraic engine 116 generates a correlation of facet pairs indicative of words in a set of documents by defining an associative array 150 having document indicators 154-4 as a first axis 158-1, a second axis 158-2 having words contained therein, and relations 156 indicative of words included in each document, in which the document indicators 154-4 reference the set of query documents (i.e. by title or filename), as shown at step 317. The algebraic engine 116 multiplies the associative array 150 by its transpose 150-2 to generate a correlation matrix 150-3 indicative of facet pairs of the words in the documents 158-1, as in FIGS. 5-6 above, as depicted at step 318. The algebraic engine 116 computes second order associations by computing a difference of a diagonal of the correlation matrix, as disclosed at step 319 and shown in FIG. 11.

If the invoked operation was for a normalized facet search, as depicted at step 320, then the algebraic engine 116 performs a normalized facet search that indicates a relative percentage of documents 158-1 satisfying the query 146 from among those matching a word, thus indicating probative value of the match by defining a percentage of all documents containing any of the queried words 158-2.

If the selected operation from step 316 is for a keyword query, then at step 321 the algebraic engine 116 performs a document keyword query for a set of query documents having each of a set of target words given in the query 146, as depicted at step 321. This includes, at step 322 defining an associative array 150 having document indicators as a first axis 158-1, a second axis 158-2 having words contained therein, and a set of relations 156 indicative of words included in each document, in which the document indicators reference the set of query documents (e.g. title, filename), as shown at step 322. Based on the user 122 input query 146, the query processor identifies keywords defining a conjunctive query, such that the keywords corresponding to the set of target words on the second axis 158-2, as shown at step 323. The algebraic engine 116 generates a count array by scanning the associative array 150-1 to identify the document indicators 154-4 for documents containing all the queried keywords, as depicted at step 324, and defines a logical inverse of the count array having transposed axes, as disclosed at step 325. The algebraic engine 116 multiplies the defined logical inverse by each row in the associative array 150 (the original input associative array 144) indicative of a document satisfying the query 146, as depicted at step 326, and also shown in FIGS. 5 and 6. In a further implementation, the query 146 may include track analysis for time/place/entity queries, in which case the algebraic engine 116 computes logistical transitions based on time and location values by identifying a time, place and entity track in the associative array 150, in which the identified track correlates, from a common document entity defined by a first axis value 158-1, a plurality of relations indicative of a time and place of the identified entity (such as defined by a query 146 keyword), as depicted at step 327 and shown further below with respect to FIG. 12.

Upon completion, the query processor 114 receives, from the algebraic engine 116, a result matrix 144 computed from the applied mathematical operation 117, as shown at step 328.

The user device 120 receives and renders the result matrix 144 computed from the applied mathematical operation 117, as depicted at step 329.

The algebraic engine 116 is configured for performing a variety of operations and functions based on linear algebra and matrix processing. Invocations may be performed by an interpreted or called interface, based on linking and binding operations to the DB server 110 and associated applications executing on the user rendering devices 122-N.

For example, a "*" may represent a matrix multiplication to the algebraic engine. C=A*B is the linear algebraic product of the matrices A and B. More precisely, If A is an m-by-p and B is a p-by-n matrix, the i,j entry of C is defined by $$C(i, j) = \sum_{k=1}^{P} A(i,k)B(k,j)$$

The product C is an m-by-n matrix. For nonscalar A and B, the number of columns of A must equal the number of rows of B. One can multiply a scalar by a matrix of any size. In the example configuration, the algebraic engine 116 may be configured to perform operations including, but not limited to the following:

| | |
|---|---|
| + | Addition |
| + | Unary plus |
| − | Subtraction |
| − | Unary minus |
| * | Matrix multiplication |
| ^ | Matrix power |
| \ | Backslash or left matrix divide |
| / | Slash or right matrix divide |
| ' | Transpose |
| .' | Nonconjugated transpose |
| .* | Array multiplication (element-wise) |
| .^ | Array power (element-wise) |
| .\ | Left array divide (element-wise) |
| ./ | Right array divide (element-wise) |
| abs | Absolute value and complex magnitude : abs(X) |
| colon (:) | Create vectors, array subscripting, and for-loop iterators |
| diag | Diagonal matrices and diagonals of matrix |
| disp | Display text or array |
| display | Display text or array (overloaded method) |
| eq | Test for equality : A == B , eq(A, B) |
| ge | Test for greater than or equal to : A >= B , ge(A, B) |
| gt | Test for greater than : A > B , gt(A, B) |
| iscolumn | Determine whether input is column vector |
| isempty | Determine whether array is empty |
| isequal | Test arrays for equality |
| max | Largest elements in array |
| min | Smallest elements in array |
| ndims | Number of array dimensions |
| ne | Test for inequality : A ~= B , ne(A, B) |
| or | Find logical OR of array or scalar inputs A | B | . . . , or(A, B) |
| sum | Sum of array elements B = sum(A) , B = sum(A, dim) |

Figure 11:
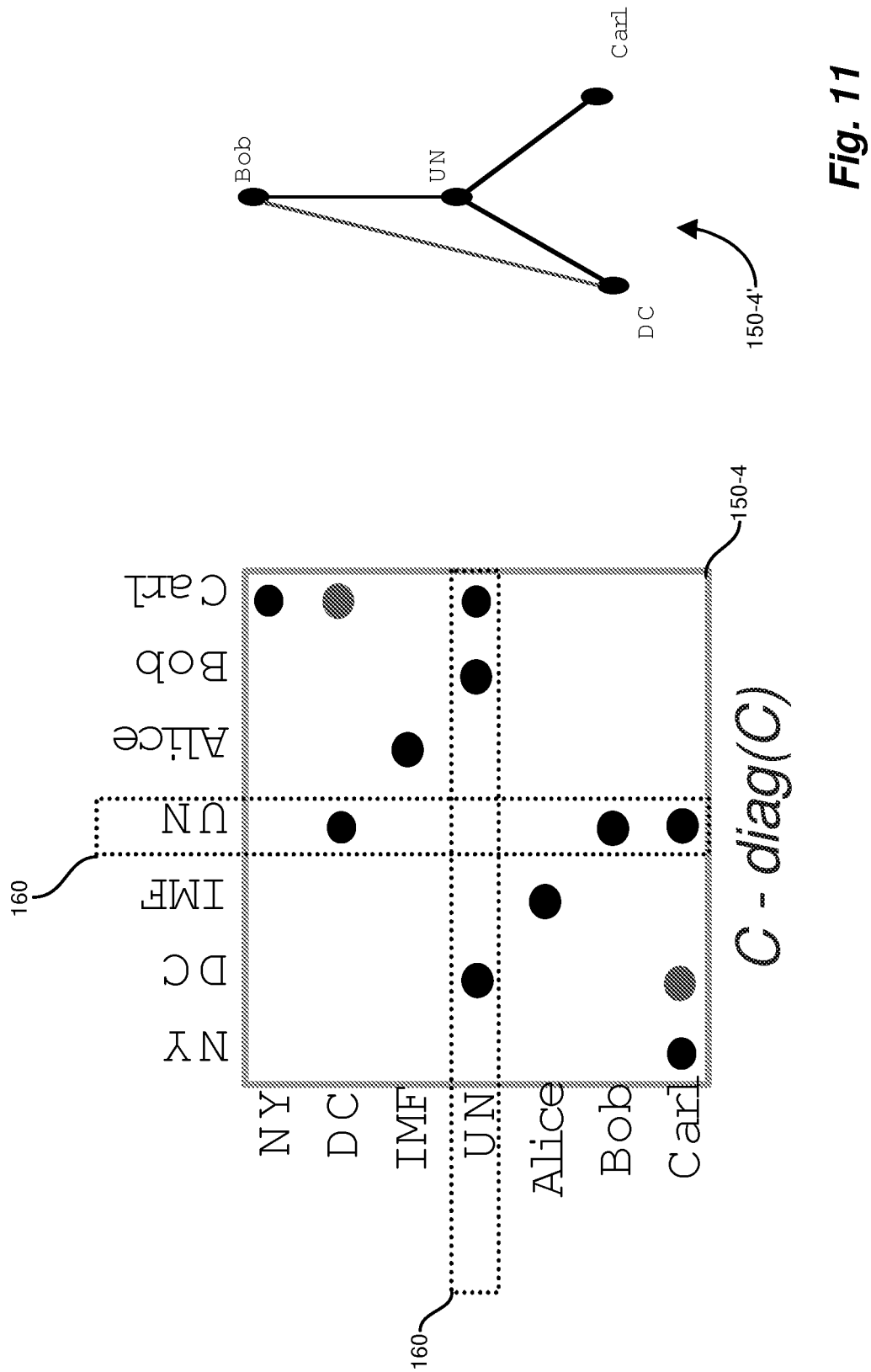
FIG. 11 shows second order connections (relations) in the correlation of FIG. 6.

FIG. 11 shows second order connections (relations) in the correlation of FIG. 6. Referring to FIG. 11, the algebraic engine 116 performs a difference operation of matrix 150-3 and the diagonal of itself, resulting in matrix 150-4. Using the correlation matrix 150-3 (C) of FIG. 6, second order connections (triangles) are readily computable by a sequence of matrix operations. Facets corresponding to the neighbors of facet UN are given by the box 160 (both are the same due to the diagonal nature of the result 150-4:

$$Y = \text{Key}((C(UN, :) + C(:, UN))$$
$$= \{DC, Bob, Carl\}$$

Triangles for the above result are shown in node graph 150-4', and given by the equation:

$$C(y,y)-C(UN,:)-C(:,UN)=\{DC,Bob\}$$

Figure 12:
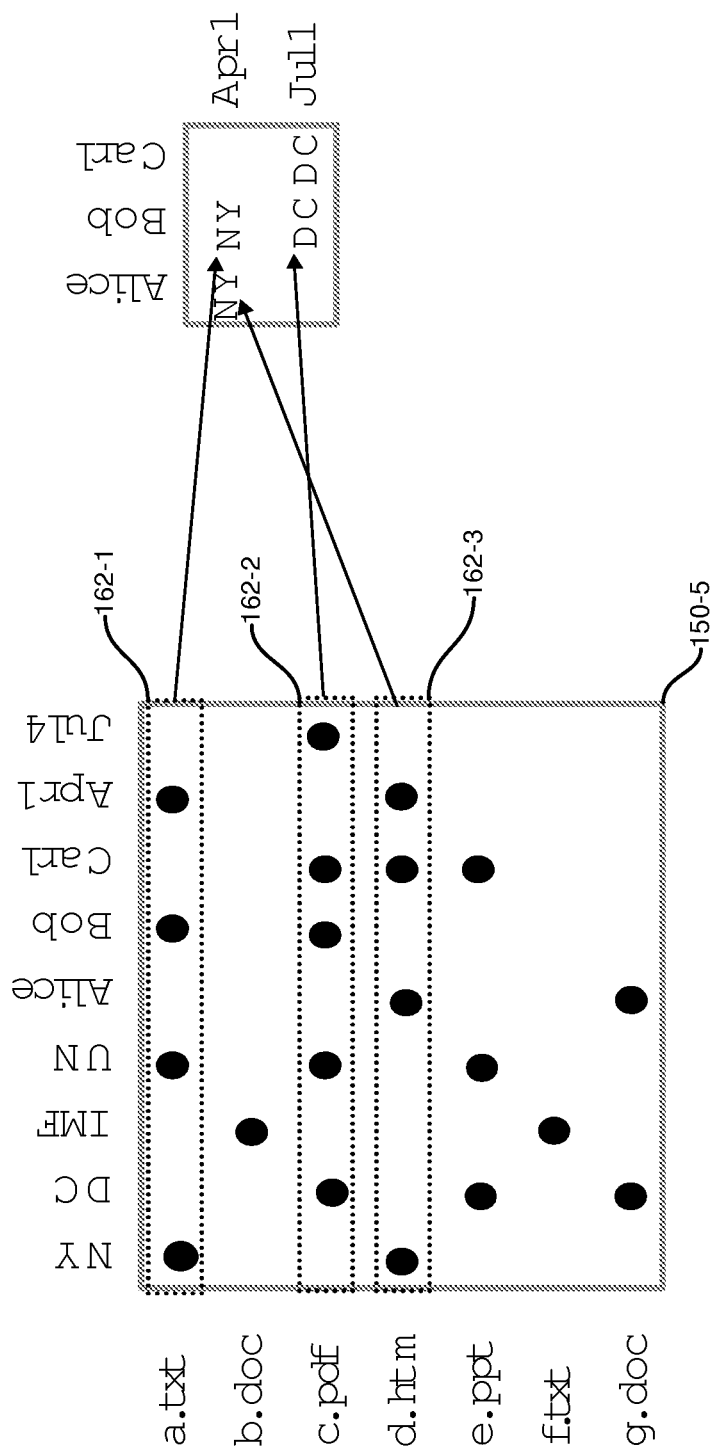
FIG. 12 shows tracks resulting from time/place/entity facets stored in an associative array as in FIG. 4.

FIG. 12 shows tracks resulting from time/place/entity facets stored in an associative array as in FIG. 4. Addition of time stamps as facets in the axis data set 154 allows the algebraic engine 116 to an associative array 150-6 relating times and entities. Referring to FIG. 12, an associative array 150-5 adds date facets "Apr 1" and "Jul 4" to an associative array 150-5 having similar facets as FIG. 4. An association of a data set 154 facets for a person and a location to another data set 154 facet of a date identifies a set of results indicative of a likely location of the person entity on a particular date, as given by documents containing references to the person, place and time, as shown by boxes 162-1 . . . 162-3.

Interactive syntax for performing database operations using an associative array as disclosed above is as follows. Referring again to FIG. 1, a user 122 employs an interactive device 120 for connecting to a database:

DB=Dbserver('f-2-2.llgrid.ll.mit.edu', 'cloudbase');
T=DB('ReutersData');
A=T(:, :);
The loaded array is viewed:
disp (A)
Associative Array
  row: [1×1704887 char]
  col: [1×322494 char]
  val: ' '
  A: [73730×13510 double]

A facet search, or query, for the number of occurrences of "New York" and "John Howard" in conjunction with other facets (terms):

| | | |
|---|---|---|
| x = 'NE_LOCATION/new york, '; | | y = ' |
| NE_PERSON/JOHN HOWARD, '; | | |
| F = ( noCol (A( : , x) ) & noCol (A( : , y) )  ) .' * A; | | |
| displayFull (F. ' ) | | |
| | 1 | |
| NE_LOCATION/asia | | 1 |
| NE_LOCATION/Australia, | 3 | |
| NE_LOCATION/London, | | 1 |
| NE_LOCATION/new york, | 4 | |
| NE_LOCATION/new Zealand, | 1 | |
| NE_LOCATION/Tokyo, | 1 | |
| NE_LOCATION/united states, | 1 | |
| NE_LOCATION/Washington, | 2 | |
| NE_LOCATION/BILL CLINTON AN, | 1 | |
| NE_LOCATION/DAVID KEMP, | 1 | |
| NE_LOCATION/JIM MIDDLETON, | 1 | |
| NE_LOCATION/JOHN HOWARD, | 4 | |
| NE_LOCATION/LINDSAY TANNER AN, | | 1 |
| NE_LOCATION/PAULINE HANSON, | 1 | |
| NE_LOCATION/RONALD HOWARD, | 1 | |
| NE_LOCATION/TONY BLAIR | 1 | |

A complementary normalized facet search indicates the relative number (percentage) of documents in which the two terms were found together in comparison with the total number of documents containing either, lending some insight into trivial matches:

```
Fn = F ./ sum(A , 1) ;
DisplayFull (Fn.' )
                                            1
NE_LOCATION/asia                    0.00041322,
NE_LOCATION/Australia,              0.00094073,
NE_LOCATION/London,                 0.00011409,
NE_LOCATION/new york,               0.00036617,
NE_LOCATION/new Zealand,            0.00087951,
NE_LOCATION/Tokyo,                  0.00019106,
NE_LOCATION/united states,          4.1918e-05,
NE_LOCATION/Washington,             0.00044693,
NE_LOCATION/BILL CLINTON AN,        0.011364,
NE_LOCATION/DAVID KEMP,             0.25,
NE_LOCATION/JIM MIDDLETON,          0.25,
NE_LOCATION/JOHN HOWARD,            0.020305,
NE_LOCATION/LINDSAY TANNER AN,      1,
NE_LOCATION/PAULINE HANSON,         0.033333,
NE_LOCATION/RONALD HOWARD,          1,
NE_LOCATION/TONY BLAIR              0.0068966,
```

A correlation of all facet pairs similar to FIGS. 5 and 6 above:

```
A+A = sqIn (A) ;                d = diag(Adj(A+A) ) ;
A+A = putAdj(A+A,   Adj(A+A)   - diag(d) ) ;
Disp (A+A)
Associative Array
    row: [1×322494 char]
    col: [1×322494 char]
    val: ' '
    A: [13510×13510 double]
```

And a normalized correlation of a multi-facet query is as follows:

```
[i j v] = find (Adj (A+A) );
AtAn = putAdj (A+A, sparse (i, j, v. /min (d (i), d(j) ) )   ) ;
X = 'NE_LOCATION/new york,' ;       p = '
NE_PERSON/*,' ;
    (A+A (x, p) > 0.9)
(NE_LOCATION/new york, , NE_PERSON/AL YOON, )        1
(NE_LOCATION/new york, , NE_PERSON/BETTY WONG, )        1
(NE_LOCATION/new york, , NE_PERSON/CHRIS REESE, )     1
(NE_LOCATION/new york, , NE_PERSON/HENRY HU, )     0.93827
(NE_LOCATION/new york, , NE_PERSON/HU JOHNSON, )
    0.91892
(NE_LOCATION/new york, , NE_PERSON/JENNIFER WESTHO, ) 1
(NE_LOCATION/new york, , NE_PERSON/JOSE PAUL, )           1
(NE_LOCATION/new york, , NE_PERSON/NANCY LE, )     1
(NE_LOCATION/new york, , NE_PERSON/STEVEN DICKSON, )   1
```

Those skilled in the art should readily appreciate that the programs and methods for representing a set of data as an associative array in a sparse matrix as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions from a non-transitory computer readable storage medium. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of representing a set of data as an associative array in a sparse matrix has been particularly shown and described with references to embodiments thereof, it will be understood by those skilled in the art that various changes in form and details may be made therein without departing from the scope of the invention encompassed by the appended claims.

What is claimed is:

1. A method of querying a database comprising:
    generating a sparse array having a set of values for a first axis, a set of values for a second axis, and a set of tuples, each tuple corresponding to an array value associated with a first axis value and a second axis value;
    identifying a set of first values corresponding to a range of attributes for the first axis;
    identifying a set of second values corresponding to a range of attributes for the second axis;
    storing, for each relation between a first axis value and a second axis value, the array value in a tuple;
    identifying an array operation, the generated sparse array responsive to the identified array operation;
    invoking an algebraic engine for performing the identified array operation;
    defining a database as a set of tables, each table in the set of tables being a sparse array having a first axis and a second axis for associating a pair of values with a relation value, the relation value defining an association between the pair of values; and
    overloading an operator of the algebraic engine for defining the identified array operation, the overload corresponding to a type of the array values.

2. The method of claim 1 further comprising representing each table as a sparse array, the representation including each association by defining a tuple having each pair of values with the corresponding relation value.

3. The method of claim 1 wherein the sparse array is defined by the set of first values defining a first axis of a matrix and the set of second values defining a second axis of the matrix, the sparse array representing only values defined by a first and second axis value, other permutations of first axis and second axis values remaining undefined.

4. The method of claim 3 wherein the sparse array is an associative array, the associative array having a sequence of tuples, a first value in each tuple defining a first axis in a matrix, a second value in each pair defining a second axis of a matrix, and the relation value defining a data point of the matrix.

5. The method of claim 1 further comprising performing queries by invoking an algebraic engine, the algebraic engine for performing matrix operations, further comprising:
    employing a sparse array as a matrix responsive to a matrix operation;
    identifying a mathematical operation responsive to matrices;
    applying the identified mathematical operation to the matrix; and
    receiving, from the algebraic engine, a result matrix computed from the applied mathematical operation.

6. The method of claim 5 wherein the applied mathematical operations are composable mathematical operations such that the result matrix is an associative array responsive to a subsequent mathematical operation, the mathematical operation determined from an overloaded operator, the overloaded operator responsive to a type of data in the result matrix.

7. The method of claim 5 further comprising generating a correlation of facet pairs indicative of words in a set of documents by:
defining an associative array having document indicators as a first axis, a second axis having words contained therein, and a relation indicative of words included in each document, the document indicators referencing the set of query documents; and
multiplying the associative array by its transpose to generate a correlation matrix indicative of facet pairs of the words in the documents.

8. The method of claim 7 further comprising computing second order associations by computing a difference of a diagonal of the correlation matrix.

9. The method of claim 5 further comprising performing a document keyword query for a set of query documents having each of a set of target words comprising:
defining an associative array having document indicators as a first axis, a second axis having words contained therein, and a relation indicative of words included in each document, the document indicators referencing the set of query documents;
identifying keywords defining a conjunctive query, the keywords corresponding to each of the set of target words on the second axis;
generating a count array by scanning the associative array to identify the document indicators for documents containing all the queried keywords; and
defining a logical inverse of the count array having transposed axes; and
multiplying the defined logical inverse by each row in the associative array indicative of a document satisfying the query.

10. The method of claim 9 further comprising computing logistical transitions based on time and location values by identifying a time, place and entity track in the associative array, the identified track correlating, from a common document entity defined by a first axis value, a plurality of relations indicative of a time and place of the identified entity.

11. The method of claim 5 further comprising performing a normalized facet search that indicates relative percentage of documents satisfying the query from among those matching a word, thus indicating probative value of the match by defining a percentage of all documents containing any of the queried words.

12. A method of representing a set of data as a sparse matrix comprising:
identifying relations between a first value set and a second value set, each relation indicative of an attribute defined by a first value and a second value;
defining, for each relation, the first value in the first value set and the second value in the second value set;
associating, for each relation, the attribute corresponding to the defined relation;
storing the set of data in a sparse matrix having the first value set as a first axis, the second value set as a second axis, and the corresponding association as a tuple, the sparse matrix responsive to at least one other sparse matrix for performing composable mathematical operations, the composable mathematical operations generating another composable sparse matrix;
defining the sparse matrix as an associative array, the associative array having a linear set of elements, each element having a tuple including the first value, the second value and the corresponding attribute; and
representing a database using a plurality of sparse matrices, the database having tables, each table defined as a sparse matrix, the sparse matrix including a tuple for each non-null value, the tuple including a value for each dimension and an attribute defined by the dimension values.

13. The method of claim 12 wherein the sparse matrix is defined by the set of first values defining a first axis of a matrix and the set of second values defining a second axis of the matrix, the sparse array representing only values defined by a first and second axis value, other permutations of first axis and second axis values remaining undefined.

14. The method of claim 13 wherein the sparse array is an associative array, the associative array having a sequence of tuples, a first value in each tuple defining a first axis in a matrix, a second value in each pair defining a second axis of a matrix, and the relation value defining a data point of the matrix.

15. The method of claim 12 further comprising performing queries by invoking an algebraic engine, the algebraic engine for performing matrix operations, further comprising:
employing a sparse array as a matrix responsive to a matrix operation;
identifying a mathematical operation responsive to matrices;
applying the identified mathematical operation to the matrix; and
receiving, from the algebraic engine, a result matrix computed from the applied mathematical operation.

16. The method of claim 15 wherein the applied mathematical operations are composable mathematical operations such that the result matrix is an associative array responsive to a subsequent mathematical operation, the mathematical operation determined from an overloaded operator, the overloaded operator responsive to a type of data in the result matrix.

17. A computer program product having an encoded set of processor based instructions on a non-transitory computer readable storage medium for performing a method of method of querying a database, the method comprising:
generating a sparse array having a set of values for a first axis, a set of values for a second axis, and a set of tuples, each tuple corresponding to an array value associated with a first axis value and a second axis value;
identifying a set of first values corresponding to a range of attributes for the first axis;
identifying a set of second values corresponding to a range of attributes for the second axis;
storing, for each relation between a first axis value and a second axis value, the array value in a tuple;
identifying an array operation, the generated sparse array responsive to the identified array operation;
invoking an algebraic engine for performing the identified array operation;
defining a database as a set of tables, each table in the set of tables being a sparse array having a first axis and a second axis for associating a pair of values with a relation value, the relation value defining an association between the pair of values; and
overloading an operator of the algebraic engine for defining the identified array operation, the overloading corresponding to a type of the array values.

18. The method as in claim 17 wherein the sparse array has a dynamic column structure not bound by a rigid schema, at least one of the axes represented by a list of array values expandable with the addition of tuples.

19. The method as in claim 18 wherein the identified array operation performs similar processing and generating a similar result as a sequence of SQL code, the SQL code consuming at least ten times the number of code instructions.

20. The method of claim 1 wherein said tuple occupies memory only for non-null entries as a linear row, column, value tuple.

21. The method of claim 12 wherein said tuple occupies memory only for non-null entries as a linear row, column, value tuple.

22. The method of claim 17 wherein said tuple occupies memory only for non-null entries as a linear row, column, value tuple.

* * * * *